United States Patent [19]

Schwab

[11] Patent Number: 5,512,085
[45] Date of Patent: Apr. 30, 1996

[54] VENTURI SCRUBBER AND METHOD WITH OPTIMIZED REMOTE SPRAY

[75] Inventor: James J. Schwab, Napa, Calif.

[73] Assignee: EnviroCare International, Inc., Novato, Calif.

[21] Appl. No.: 334,280

[22] Filed: Nov. 4, 1994

Related U.S. Application Data

[63] Continuation-in-part of Ser. No. 182,639, Jan. 14, 1994, which is a continuation-in-part of Ser. No. 904,208, Jun. 25, 1992, Pat. No. 5,279,646.

[51] Int. Cl.⁶ ..................................................... B01F 3/04
[52] U.S. Cl. ................... 95/200; 95/225; 55/223; 55/257.6; 261/116; 261/DIG. 54; 261/22
[58] Field of Search ............................. 95/224, 225, 200, 95/202; 55/223, 257.6; 261/116, DIG. 54, 22

[56] References Cited

U.S. PATENT DOCUMENTS

| | | | |
|---|---|---|---|
| 2,810,450 | 10/1957 | Hartmann | 95/225 |
| 2,981,370 | 4/1961 | Pilo | 95/225 |
| 3,883,327 | 5/1975 | Thompson et al. | 95/224 |
| 4,141,701 | 2/1979 | Ewan et al. | 261/DIG. 54 |
| 4,364,750 | 12/1982 | Koncz | 261/117 |
| 4,401,444 | 8/1983 | Teller | 261/DIG. 54 |
| 4,735,636 | 4/1988 | Roberts | 95/8 |
| 5,039,315 | 8/1991 | Liao et al. | 95/225 |
| 5,279,646 | 1/1994 | Schwab | 95/201 |

Primary Examiner—Tim R. Miles
Attorney, Agent, or Firm—Coudert Brothers

[57] ABSTRACT

An air pollution control system incorporating a venturi scrubber and a method of cleansing a particulate-laden, contaminated gas flow are disclosed. Spray nozzles are used to introduce optimized droplets of a scrubbing liquid into the venturi to maximize the collection efficiency for optically active particles. The spray nozzles introduce the optimized droplets substantially upstream of the throat of the venturi such that the spray mixes with the effluent gas flow and cools the gas flow to substantially its saturation temperature prior to entering the venturi throat. This promotes collection of condensibles and inhibits the revolatilization of contaminants that are collected by the scrubbing droplets which might otherwise evaporate in the hot gas flow. The optimized droplets are highly effective in rapidly cooling the effluent gas flow.

16 Claims, 4 Drawing Sheets

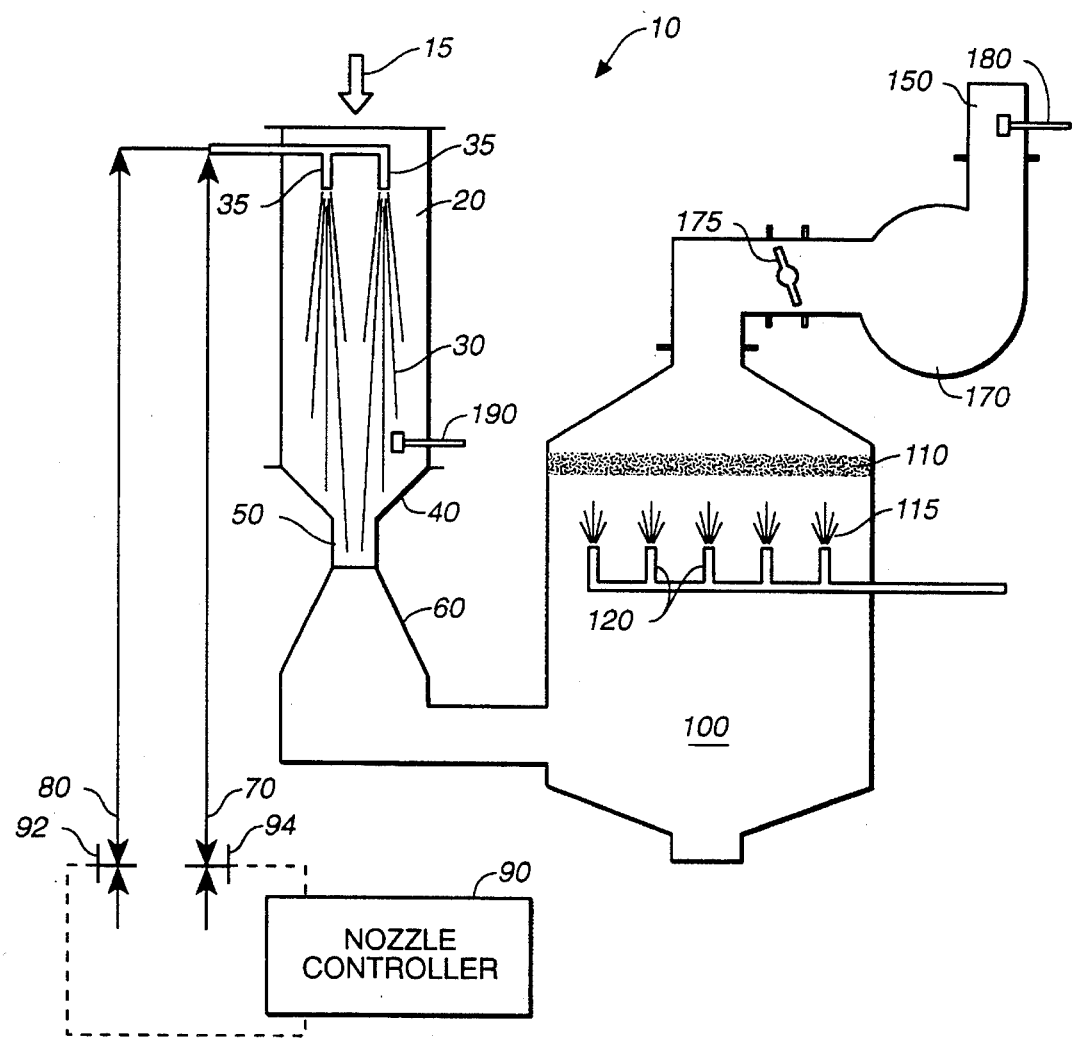
FIG._1

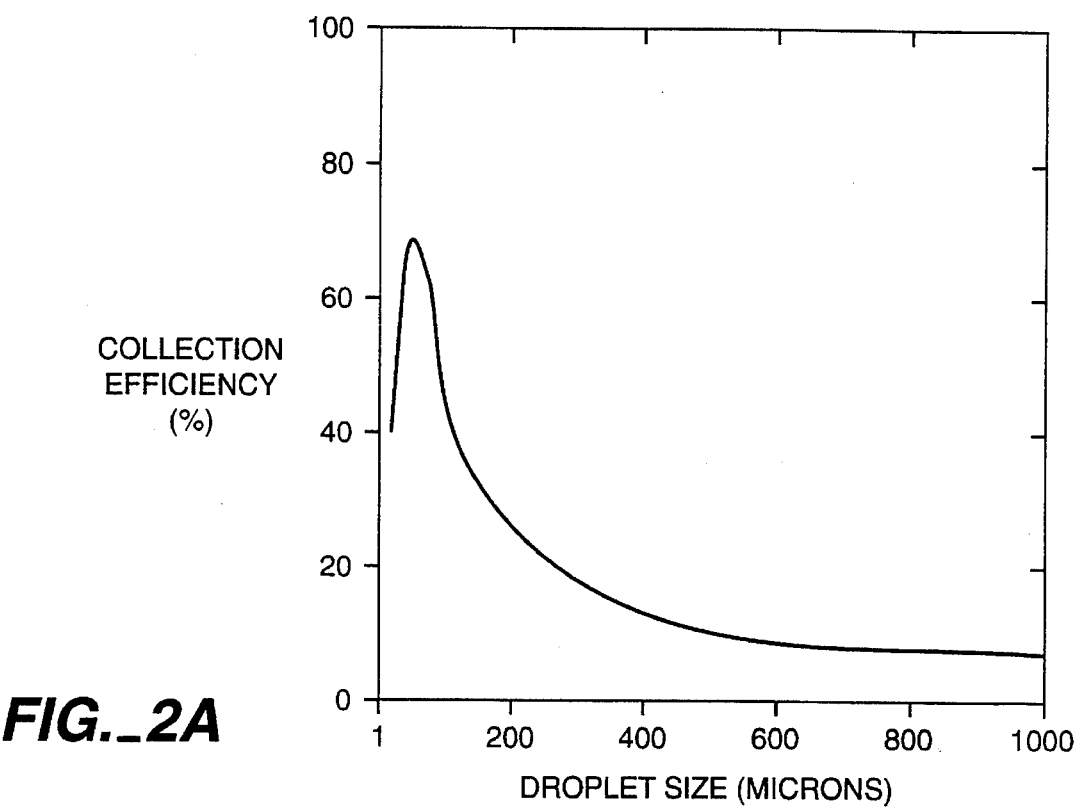
FIG._2A
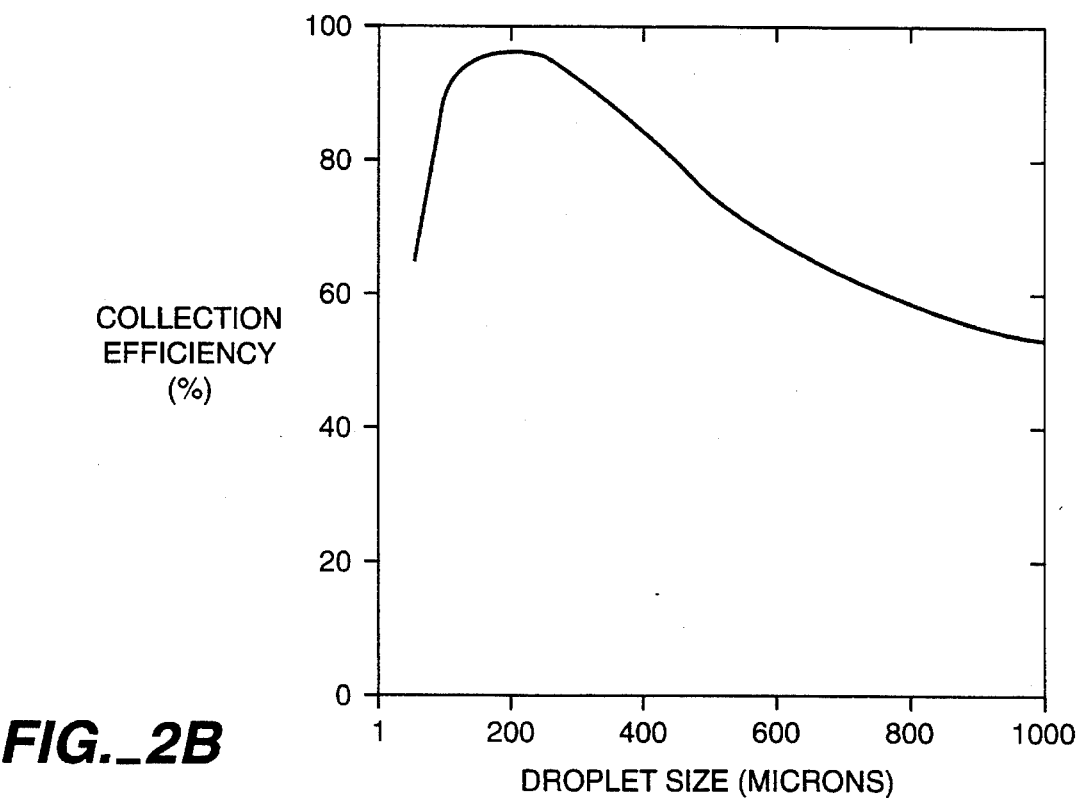
FIG._2B

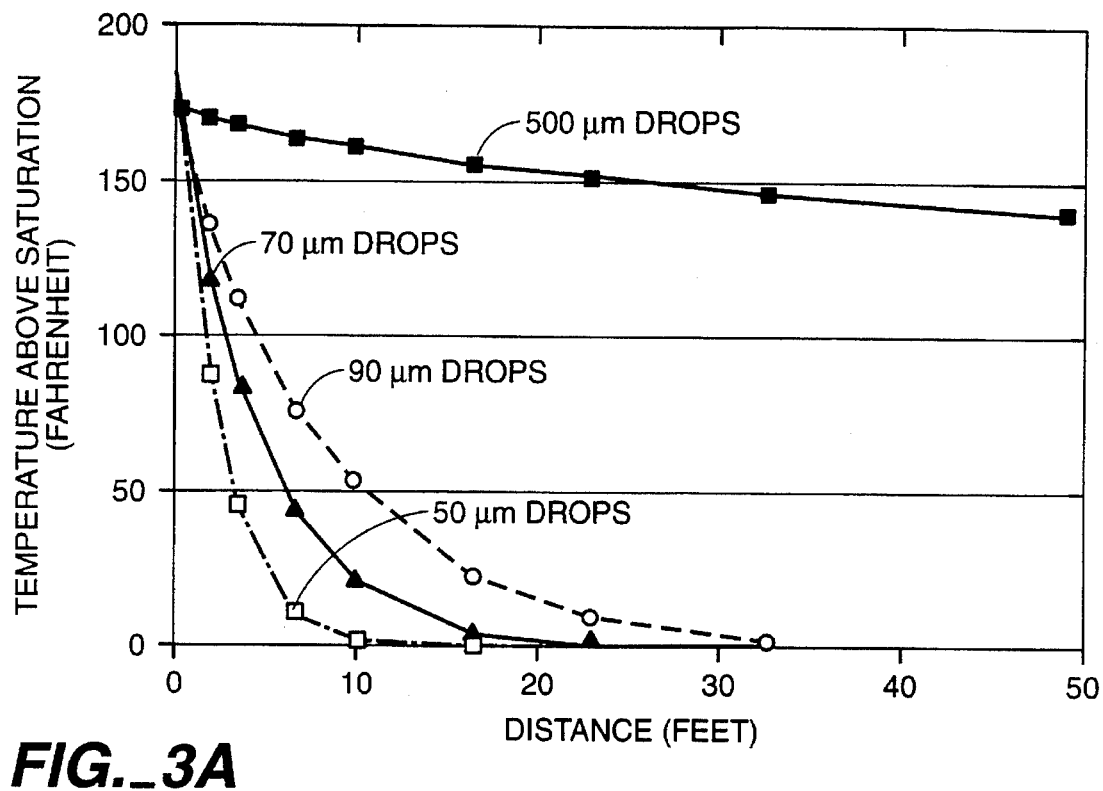
FIG._3A
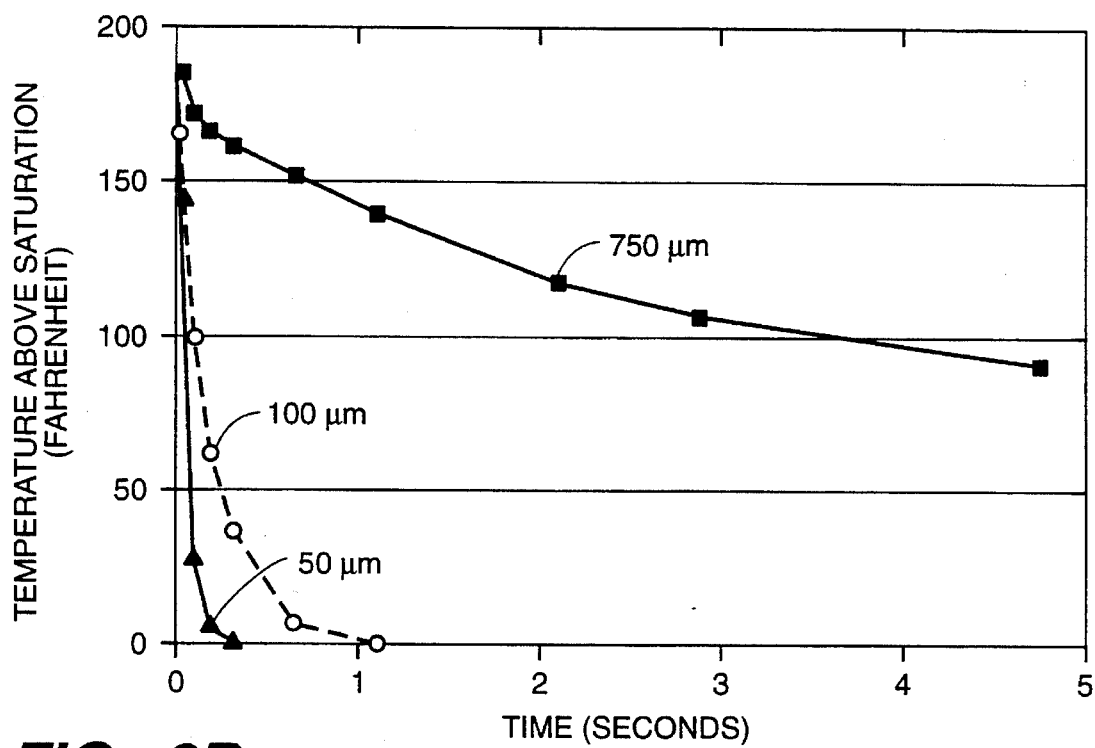
FIG._3B

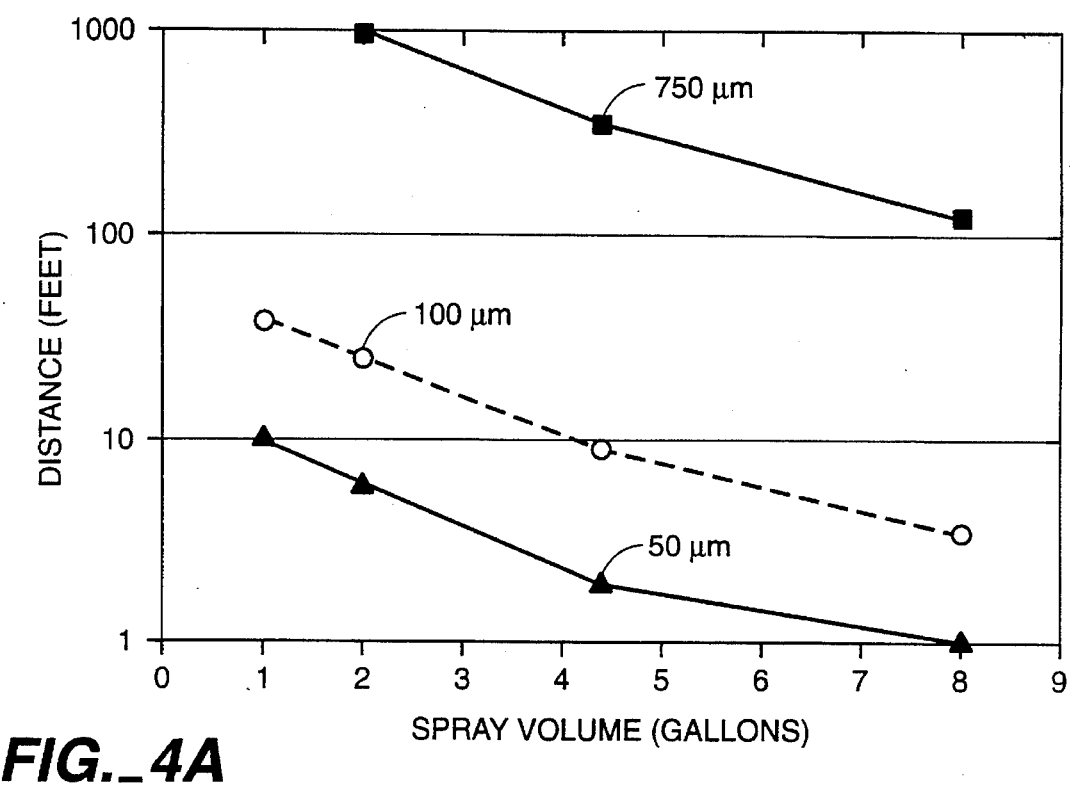
FIG._4A
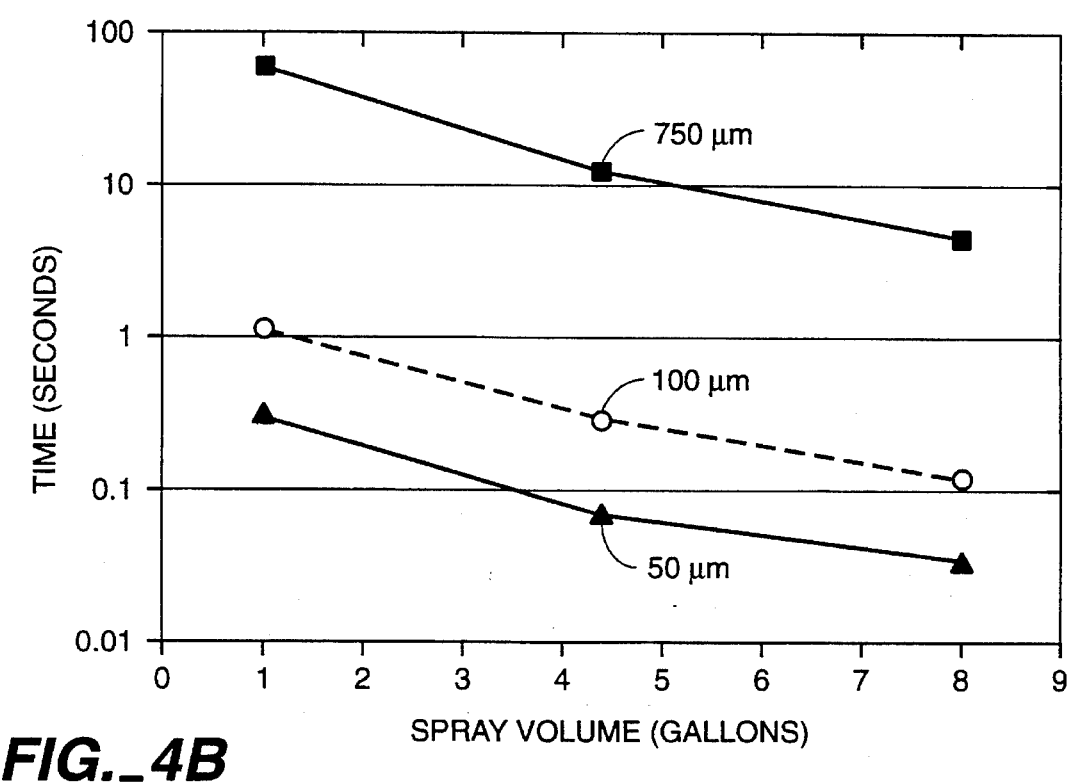
FIG._4B

VENTURI SCRUBBER AND METHOD WITH OPTIMIZED REMOTE SPRAY

RELATED CASES

This case is a continuation-in-part of U.S. Ser. No. 08/182,639, filed Jan. 14, 1994, which was a continuation-in-part of U.S. Ser. No. 07/904,208, filrd Jun. 25, 1992 now U.S. Pat. No. 5,279,646 issued Jan. 18, 1994, the disclosures of which are hereby incorporated by reference.

FIELD OF THE INVENTION

This invention relates to the field of air pollution control, and is particularly directed to an improved venturi wet scrubbing system for removing contaminants from a hot gaseous effluent stream.

BACKGROUND OF THE INVENTION

Over the past several decades the control of air pollution has become a priority concern of society. The United States, and other countries, have developed highly elaborate regulatory programs aimed at requiring factories, and other major sources of air pollution, to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, and so there is also a constant demand for more energy efficient technologies.

One well known type of device for removing contaminants from a gaseous effluent stream is the venturi scrubber. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. A scrubbing liquid in the form of droplets, typically of water, is added to the venturi, usually at the throat, and enters the gas flow. The water droplets used are generally many orders of magnitude larger than the contaminant particles to be collected and, as a consequence, accelerate at a different rate through the venturi. The differential acceleration causes interactions between the water droplets and the contaminant particles, such that the contaminant particles are collected by the water droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting soluble gaseous compounds by diffusion. A detailed description of these scrubbing mechanisms is discussed in Chapter 9 of *Air Pollution Control Theory*, M. Crawford, (McGraw-Hill 1976).

After the particulate contaminants are collected by the water droplets, the water droplets are then removed from the effluent stream which is thereby cleansed. Removal of the water droplets may be accomplished by a number of known means. The various removal methods rely on the fact that the water droplets are relatively large and, due to inertia, cannot change direction rapidly. For example, the gas flow may be directed toward a surface such as an impingement plate. While the gas moves around the surface, the inertia of the relatively large water droplets causes them to strike the surface where they are captured. Likewise, if the droplets are subjected to a circular flow, as in a cyclonic separator, the large droplets will collide with the wall of the separator due to centripetal force.

Most venturi scrubbers in use today are "self-atomizing," i.e., the droplets are formed by allowing a liquid to flow into the throat of the venturi where it is atomized by the gas flow. While very simple to implement, this method is not able to produce droplets of very small diameter. Although not much utilized in commercial embodiments, it has previously been taught that the collection efficiency of a venturi scrubber is related to the size of the water droplets used in the scrubber. In particular, it has been taught that the collection efficiency increases as the surface area of the water droplets used in the scrubber, and it is well known that the surface area of a given quantity of liquid increases with decreasing droplet size. Thus, given this teaching, it would seem that the droplet size of the scrubbing liquid should be reduced to the minimum.

However, as recognized by the inventor hereof and as taught herein, there is a point at which a further decrease in the size of the droplets of the scrubbing liquid begins to become detrimental. As a practical matter, prior art venturi scrubbing devices, even those which claimed to utilize very fine droplets, actually utilize droplets which are much larger than is optimal according to the teachings hereof.

The primary methods heretofore utilized in improving the collection efficiency of a venturi scrubber have been to decrease the size of the throat or to increase the overall rate at which gas flows through the system. Both of these methods increase the differential velocities between the contaminant particles and liquid droplets as they pass through the throat of the venturi. This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall flow resistance attributable to the reduced throat diameter, or to the increased overall flow rate through the venturi. In either case, the pressure drop across the venturi is increased and greater pumping capacity is required. Accordingly, heretofore, efforts to increase the fine particle collection efficiency of a venturi scrubber have involved substantial increased energy input into the system.

Of particular concern to those in the field of air pollution control is the collection of "optically active" particles. As used herein, the term "optically active particles" should be understood to mean particles having a diameter in the range of approximately 0.1 to 1.0 microns. These particles are difficult to collect in conventional venturi scrubbers due to their small size. Nonetheless, particles in this size range often comprise toxic material the release of which is not permitted. Due to the relatively large surface area of optically active particles, they absorb a disproportionate amount of contaminants. As their name implies, optically active particles interact with light. Even if they do not contain toxic components, the emission of optically active particles is highly visible and undesirable from an aesthetic point of view.

(Particles which are larger in diameter than about 1.0 micron are also sometimes considered optically active.

However, the present invention is not directly concerned with the collection of these larger particles and they have, therefore, not been included in the definition of the term optically active as used herein. It is considered that particles larger than 1.0 micron in diameter are relatively much easier to collect.)

Air pollution control systems employing venturi scrubbers are frequently used in situations where the qualities of the flow of contaminated gas through the system varies over time. For example, the volume of gas flow, the temperature of the gas flow or the particle loading of the gas flow will vary. As already described, most venturi scrubbers used rely on self-atomization to form scrubbing droplets. In such a system, the reduction in flow through the venturi accompanying any reduction in the flow volume of contaminated gas reduces the number of scrubbing droplets formed, thereby adversely affecting the scrubbing efficiency. Moreover, the reduced flow reduces the differential acceleration of droplets and particles through the venturi further reducing scrubbing efficiency.

The concentration, size and nature of the particles in a contaminated gas flow will vary over time due to a number of factors. In order to comply with regulatory requirements, the scrubbing system must be capable of effective operation when faced with maximum particulate loading of gas flow. However, the required maximum level of scrubbing is not likely to be necessary under all circumstances, and operating efficiencies can be achieved by reducing the scrubbing level when it is not needed.

Finally, if the temperature of the effluent gas flow is hot, as in many cases, such that the gas flow is substantially above its saturation temperature, particles that are collected by droplets in the venturi may re-enter the gas flow after scrubbing. This may occur, for example, where the droplet which captured one or more contaminant particles evaporates downstream of the venturi before it is collected. In many industrial processes, the water vapor content of the gas flow is low relative to saturation conditions so that fine droplets introduced into the gas flow will readily evaporate even at only moderately elevated temperature. For example, the effluent gas from a coal drying system may be at a temperature of approximately 200° F. with a humidity of less than ten percent (10%). Even when droplets containing a captured contaminant do not evaporate, the high temperature of the gas flow can cause the contaminant within fine droplets to volatilize and re-enter the effluent flow.

Accordingly, it is an object of the present invention to provide an improved venturi scrubber that is capable of increased particle collection without the need to increase the rate of gas flow through the system or to decrease the size of the venturi throat.

Another object of the present invention is to provide an improved venturi scrubber wherein the size of the droplets used to collect contaminant particles is optimized.

Another object of the present invention is to provide a venturi scrubber having a high collection efficiency without the need for a commensurate increase in the energy input to the system, as compared to the prior art.

Yet another object of the present invention is to provide a nozzle for use in a venturi scrubber which has the characteristics needed to efficiently generate droplets having an optimal size for collecting optically active contaminant particles.

A further object of the present invention is to provide an air pollution control system which efficiently cools the gas flow prior to the scrubbing stage such that the scrubbing droplets do not readily evaporate downstream of the scrubber and the contaminant particles are not revolatilized.

SUMMARY OF THE INVENTION

The foregoing objects of the present invention, and others that will be apparent to those skilled in the art alter reading this specification in conjunction with the accompanying drawings and the appended claims, are realized by a novel air pollution control system. In its basic form, the present invention comprises a venturi scrubber having means for introducing droplets of a scrubbing liquid having a predetermined optimal diameter. In the preferred embodiment, the optimal diameter of the scrubbing liquid droplets is about two and three orders of magnitude greater than the median diameter of the optically active particles in the effluent. More specifically, the scrubbing droplets are, preferably, between 10 and 200 microns, and should be between about 100 to 500 times the diameter of the optically active particles. In one embodiment, a spray nozzle designed to form droplets of the desired diameter comprises means for flowing a mixture of the scrubbing liquid and a gas under pressure through an orifice. By controlling the respective pressures at which the liquid and the gas are delivered to the nozzle, both the rate and the size of droplet production can be independently adjusted. According to the present invention, the spray of scrubbing droplets is introduced into the gaseous effluent flow well upstream of the throat of the venturi such that the spray serves to cool the gas flow, causing it to become substantially saturated by the time the flow reaches the venturi throat. In one preferred embodiment, nozzles are located a distance upstream from the venturi throat such that it takes the spray droplets between 0.05 and 2.0 seconds to reach the venturi throat, and more preferably, the residence time of the droplets before entering the venturi throat is between 0.1 and 1.0 seconds.

A method according to the present invention comprises the steps of introducing a spray of water droplets into a gaseous effluent flow a predetermined distance upstream of the throat of a venturi scrubber such that the gas flow becomes substantially saturated by the time that the mixture of spray droplets and gaseous effluent mixture reaches the throat of the venturi scrubber and, thereafter, causing the mixture to pass through the throat of the scrubber.

In another aspect, the present invention comprises the use of automatic control systems to monitor and regulate the volume, temperature, and/or droplet size of the spray that is introduced into the scrubbing system, to compensate for variations in the effluent flow. For example, in one embodiment the temperature of the gas flow is monitored and the amount of scrubbing liquid which is sprayed into the system is adjusted with temperature changes to ensure that the effluent gas flow is consistently maintained at substantially saturated conditions when it reaches the venturi throat. Likewise, a particle monitor may be used in the exhaust stack to govern the size of the droplets introduced into the system, thereby controlling the scrubbing efficiency.

BRIEF DESCRIPTION OF THE DRAWINGS

FIG. 1 is a partially schematic cross-sectional view of an air pollution control system according to the present invention.

FIGS. 2A and 2B are graphs showing the calculated relationship between median spray droplet diameter and particle collection efficiency for contaminant particles that are 0.1 and 1.0 microns in diameter, respectively.

FIG. 3A is a graph showing the relationship between droplet size and the distance required to cool an effluent gas flow to substantially saturation temperature. FIG. 3B is a graph showing the relationship between droplet size and the time required to cool an effluent gas flow to substantially saturation temperature.

FIG. 4A is a graph showing the relationship between droplet size, the distance required to cool an effluent gas flow to substantially saturation temperature and the liquid to gas ratio of the spray. FIG. 4B is a graph showing the relationship between droplet size, the time required to cool an effluent gas flow to substantially saturation temperature and the liquid to gas ratio of the spray.

DETAILED DESCRIPTION

Turning first to FIG. 1, an overall air pollution control system 10 of the present invention is shown. A contaminant-laden gaseous effluent stream is generated by an air pollution source (not shown) such as the exhaust of a boiler used to generate industrial steam or a coal drier. As used herein, the terms "gaseous effluent" and "contaminated gases" are intended to include effluent streams that have liquid or solid particulate material entrained therein, including vapors which may condense as the effluent stream is cooled. It should be noted that many sources of air pollution involve what is, at least initially, a hot effluent stream created as a result of a combustion process. For example, the gas flow from a boiler may be at a temperature of approximately 350° F. and the effluent flow from a coal drier may be at a temperature of approximately 200° F.

The contaminated flow of gases, depicted symbolically by arrow 15, enter the air pollution control system of the present invention and are directed into forechamber 20. As is described in greater detail below, the gases are cooled to a much lower temperature in forechamber 20, preferably to about the saturation temperature of the gas flow, i.e., the temperature at which water vapor in the gas flow is at saturation so that it will begin to condense. As is also described in greater detail below, a spray of fine droplets of water 30 from nozzles 35 is used to cool and saturate the gas flow to bring the effluent to approximately the saturation temperature. It has been discovered that the droplets of optimum diameter are not only best for effecting scrubbing within the venturi, but also are especially effective in cooling and saturating the effluent gas flow in a short distance, i.e., with minimal residence time in the system prior to entering the venturi, so that scrubbing efficiency is improved.

As is depicted in FIG. 1, nozzles 35 are remotely positioned from the entrance to the throat 50 of the venturi, described next. Preferably, the nozzles are positioned upstream of the entrance to the throat a distance such that the spray droplets take between 0.05 and 2.0 seconds from the time they are sprayed into the system to the time they enter the venturi throat. This time, i.e., the time that it takes droplets to travel from the spray nozzle to the venturi throat is referred to as the residence time. More preferably, the residence time is between 0.1 and 1.0 seconds. In a typical air pollution control system using the present invention, the gas flow moves through the system at a rate of about 70 ft./sec.

After flowing through forechamber 20, the effluent enters a venturi scrubber comprising an entrance cone 40, a throat 50 and an exit cone 60. The scrubbing liquid for the venturi is provided by the spray from nozzles 35. Preferably, nozzles 35 are two-fluid nozzles which form a spray of scrubbing liquid having droplets which are optimized for maximum collection of optically active particles. A discussion of the operation of nozzles 35, and of the formation of droplets having an optimal diameter, is set forth below. Nozzles 35 are connected to a source of water 70 and a source of compressed air 80 which are regulated by a nozzle or atomization controller 90, which regulates valves 92 and 94 governing the pressure/flow of air and water delivered to nozzles 35.

Preferably, entrance or inlet cone 40 has a greater included angle than is typically used in venturi scrubbers. Preferably, the included angle of the inlet cone is between 60° and 90°, whereas prior art venturi scrubbers generally are in the range of 30°–45°. The relatively larger included angle comes at some cost in the energy required to move gas through the venturi, but improves scrubbing efficiency by maximizing the differential velocity between the contaminant particles and the scrubbing droplets. In addition, the outlet cone is, preferably relatively long to maximize the recovery of energy from both the gas flow and from the droplets. Scrubbing will also occur in the outlet cone as the scrubbing droplets, i.e., the droplets in the optimal size range, and any remaining contaminant particles decelerate at different rates.

The mixture of effluent gases and spray droplets passes from forechamber 20 through the venturi, where the spray droplets remove contaminant particles in the manner previously described. In one embodiment of the present invention the throat velocity of the effluent gas is 200–500 feet per second, and the scrubbing liquid is introduced at a rate of 1–10 gallons per 1000 actual cubic feet (acf) of saturated effluent passing through the venturi. Preferably, the spray from nozzles 35 introduces the scrubbing liquid relatively uniformly into the effluent gas flow, such that cooling is uniformly achieved and the gas flow and the scrubbing liquid form an homogenous mixture when they enter the venturi input 40. Preferably, the differential velocity between the spray droplets and the gas flow at the point of introduction is low. If the droplets were introduced into the effluent flow at a velocity which was significantly greater than the gas flow, they would decelerate upon entering the slower moving gas flow causing agglomeration, i.e., droplet growth. Unlike some prior art venturi sprays, the spray of the present invention is not used to assist the flow of gases through the venturi.

After leaving the exit cone of the venturi 60, the contaminant laden spray droplets are removed from the effluent stream. In the exemplary air pollution control system 10 of FIG. 1, a cyclonic separator 100 with a mist eliminator 110 is used to remove the contaminated spray droplets from the effluent gas flow. As shown, mist eliminator sprays 115 from a plurality of nozzles 120 may be introduced into the gas flow just upstream of mist eliminator 110 to keep the surface wet and clean. The operation of cyclonic separators and of mist eliminators are well known to those skilled in the art and, thus, need not be discussed further. Since the mixture of effluent gases and spray droplets has been reduced to substantially saturation temperature, there is little or no evaporation of the scrubbing droplets after they exit the venturi. Thus, the present invention overcomes the problem of the prior art whereby contaminants which are captured by the scrubbing spray re-enter the gas flow before the droplets can be collected and removed from the system.

After passing through the cyclonic separator 100 and the mist eliminator 110, the effluent may be discharged into the atmosphere via stack 150. The gas flow through system 10 is propelled by induced draft fan 170 and may be controlled using fan inlet damper 175.

As noted above, the present invention uses one or more two-fluid nozzles 35 to form spray droplets having a diameter which is optimized to collect optically active particles in the effluent stream. Each nozzle 35 is fed by a source of pressurized scrubbing liquid, which is conveyed to the nozzle via feed tube 80, and a source of pressurized gas, which is conveyed to nozzle 35 via feed tube 70. Preferably, air and water are used as the gas and liquid, respectively, for convenience and to minimize operating costs. In addition, use of water as the scrubbing liquid helps the spray from nozzles 35 saturate the gas flow as some of the water evaporates. A two fluid nozzle of the type which may be used in the present invention is commercially available from EnviroCare International, of Novato, Calif., under the trademark MicroMist™.

A variety of measures are used to characterize the diameter of the droplets in a spray. In an actual spray, the diameters of the droplets will vary, i.e., no nozzle is capable of producing a spray having perfectly uniform droplets. As used herein, when referring to the diameter or median diameter of the droplets in the spray, applicant intends to refer to what is more precisely termed the median volume diameter (MVD), (sometimes referred to as the volume median diameter (VMD)). The median volume diameter is the droplet size such that fifty percent of the total volume of liquid sprayed is made up of droplets having a diameter larger than the median value and fifty percent of the total volume of liquid sprayed is made up of droplets having a diameter smaller than the median value. Preferably, the droplets in the spray are as uniform as possible such that most of the droplets have diameters close to the median value.

By controlling the flow and pressure of the gas and liquid entering nozzles 35, it is possible to independently control both the size of the droplets and the quantity of scrubbing liquid injected into the system. In particular, increasing the air pressure relative to the liquid pressure to the nozzle tends to decrease the size of the droplets produced, while increasing the water pressure increases the quantity of spray formed. Preferably, the droplets should have a mean volume diameter about two to three orders of magnitude greater in diameter than the optically active particles in the effluent stream. More particularly the droplets should be in the range between about 10 to 200 microns such that they are, optimally, about 100 to 500 times the diameter of the optically active particles in the effluent. The ability to independently adjust the characteristics of the spray is particularly useful where the characteristics of the effluent stream are variable. Thus, if the concentration or size of the optically active particles in the gas flow changes, or the temperature or water content of the effluent stream changes, the spray characteristics can be adjusted accordingly. Generally speaking, one objective of the remote spray of the present invention is to introduce a sufficient volume of liquid having droplets of a predetermined diameter such that the liquid remaining after evaporation is suitable in both volume and droplet size to optimally collect optically active particles in the effluent flow.

It is very difficult to obtain droplets of the preferred size without using a two-fluid nozzle. As noted above, most prior art venturi scrubbers rely on self-atomization, using energy from the tan to atomize the scrubbing liquid, i.e., such systems do not rely on a nozzle to form droplets. The scrubbing liquid is introduced directly into the throat of the venturi where it is atomized by the accelerating gas flow around it.

Some prior art venturi scrubbers employ single fluid liquid nozzles to introduce a spray of scrubbing liquid into the venturi. It is very difficult to produce droplets in the preferred size range using a single fluid nozzle, and it is generally not possible to independently control droplet size and volume of liquid which is sprayed. One would have to resort to extremely high nozzle pressure to obtain the desired degree of atomization and, even at high pressures, commercially available nozzles do not have the capacity to provide a large volume of liquid into the gas flow. There is no indication that any of the prior art devices known to the inventor is operated at the required pressure levels. For example, to produce droplets of the proper size, it is believed that a commercially available "fine spray" single fluid hydraulic nozzle from the Spraying Systems Company would have to be operated at over 800 psig liquid pressure, and, at that level would only deliver less than two gallons of liquid per minute to the venturi. Thus, while some prior art devices use liquid nozzles to form droplets, it is believed that prior art venturi scrubbers have not used droplets smaller than about 500–1000 microns MVD. Single fluid nozzles have an added disadvantage in that they do not allow independent control over the droplet size and the volume of liquid sprayed by the nozzle.

(One type of single fluid nozzle, the so-called high pressure hydraulic "bypass" nozzle, allows independent control over the amount of liquid sprayed and the size of the droplets. (This type of nozzle is sometimes called a "spill back" nozzle.) While less preferred than a two-fluid nozzle due to the need to operate at very high liquid pressure, the hydraulic bypass nozzle may be used in connection with the present invention since it provides the capability of independent volume/droplet size control, but over a smaller range.)

Certain teachings of the prior art suggest that the droplets used in a venturi scrubber should be made as fine as possible. This vague prior art teaching is both unqualified and unquantified, and appears to proceed from the simplistic view that the sole concern in scrubbing efficiency is the overall surface area of the scrubbing liquid droplets. Nonetheless, it is clear from the same teachings that the droplets being used are, in fact, much larger than those preferred in the present invention. As explained below, there is a lower limit to the preferred droplet size, and droplets which are much finer than this lower limit are less efficient in collecting contaminant particles.

The ability to optimize droplet size for maximum collection efficiency has been verified experimentally and has a theoretical explanation. For example, in one experiment, the inventor investigated the scrubbing efficiency of a spray having droplets roughly equal in size to the optically active particles in an effluent stream. This experiment determined that such a spray was relatively inefficient in scrubbing the effluent stream, contrary to the prior art teaching that finer droplets improved scrubbing efficiency.

The theoretical explanation of this result is understood as follows. Venturi scrubbing relies on the differential velocity between scrubbing droplets and contaminant particles. The gaseous effluent and the spray droplets both enter the inlet cone of the venturi at relatively low velocities. Differential velocities are achieved primarily as the particles and droplets undergo acceleration through the throat of the venturi. Normally, the optically active contaminant particulates, being much smaller and, consequently, having much less mass, rapidly accelerate to attain the velocity of the surrounding gas in a very short distance. On the other hand, the scrubbing liquid droplets are normally much larger and more massive, so that it takes them much longer to attain the velocity of the gas stream. Typically, these scrubbing droplets will not reach this ultimate velocity until the end of the throat or beyond the end of the throat.

Since it is the velocity differential which causes scrubbing, once the droplets and particles reach the same velocity the number of interactions between the two will be reduced to the point of insignificance, and no further particle scrubbing will occur. Thus, if the droplets start out being roughly the same size as the contaminant particles they accelerate at roughly the same rate as each other, such that no substantial velocity difference is realized as they pass through the venturi. Accordingly, if the spray droplets are too fine, i.e., of the same order of magnitude as the contaminant particles, particle scrubbing efficiency will be degraded.

Thus, the prior art teaching, that "finer is better," is valid only to a point, after which any further reduction in droplet size actually degrades scrubbing efficiency. FIG. 2A shows the calculated relationship between collection efficiency (shown as percentage on the vertical axis) and scrubbing liquid droplet size (in microns on the horizontal axis) for contaminant particles having a diameter of 0.1 micron. It is seen that the optimal droplet size is approximately 50 microns, and that collection efficiency falls off rapidly when the droplets are either smaller or larger than this optimal size. FIG. 2B shows the calculated relationship between collection efficiency and scrubbing liquid droplet size for contaminant particles having a diameter of 1.0 micron, at the upper end of the range of optically active particles. In this instance, the optimal droplet size is almost 200 microns. While in this case the fall off in collection efficiency for droplets which are not optimal is not as dramatic as it is with the smaller 0.1 micron particles, it is still quite significant.

According to the present invention, it is possible to obtain spray droplets of an optimum predetermined diameter, so that scrubbing efficiency is enhanced. In the prior art, the primary method used to increase scrubbing efficiency has been to increase the gas flow rate through the venturi, either by narrowing the throat or by increasing the overall flow rate of gas through the system. In either case, significantly more energy is required due to the need for more powerful fans, thereby raising the operating costs for the system. The present invention requires only slightly more energy to operate the nozzle than a prior art system, but the increase in scrubbing efficiency obtained per added unit of energy input is far greater than can be obtained by the prior art methods of increasing efficiency. Thus, the present invention is a highly cost effective way to improve scrubbing efficiency. For example, it is estimated that a typical prior art design utilizing self-atomization would require a pressure drop across the venturi of 55 inches of water to achieve an overall collection efficiency of 99.3%. This, in turn would require the use of 15.4 horsepower per 1000 acfm. On the other hand, the venturi of the present invention can achieve a collection efficiency of 99.4% with a pressure drop across the venturi of only 16 inches of water, and requiring only 6.3 hp/acfm.

An important aspect of the present invention is the remote placement of nozzles 35 relative to the input of the venturi throat 50. As noted, nozzles 35 are preferably positioned at a location that allows sufficient time-of-flight, based on droplet size, temperature, water vapor content and the total surface area of the droplets injected into the flow to allow cooling of the effluent gases to near saturation by the time they reach the entrance of the venturi throat. As described above, the nozzles are placed such that the spray droplets have a residence time in the system which is, preferably, between 0.05 and 2.0 seconds, and more preferably between 0.1 and 1.0 seconds. The remote nozzles of the present invention allows spray 30 to be used not only to provide scrubbing droplets for the venturi, but also to cool and saturate the gas flow such that it is substantially saturated by the time it reaches the throat of the venturi.

A heated gas containing water vapor can be brought to saturation by two means. The temperature of the gas can be lowered, or the water vapor content of the gas can be raised by the introducing additional water vapor into the gas. The spray 30 from nozzles 35 employs both mechanisms to cause the gas flow to become substantially saturated, i.e., spray 30 both cools the gas flow by convective heat transfer and introduces more water vapor into the flow by evaporation. Moreover, the evaporation of water in the droplets absorbs heat energy from the gas flow in connection with the phase transition. The spray droplets are, preferably, introduced into the gas flow at a low temperature, such that the heat energy which is absorbed from the gas flow due to convective heat exchange between the hot gas and the relatively cool liquid is substantial. Thus, cooling of the gas flow is accomplished both by heat exchange and by evaporation.

The present invention recognizes that droplets that are substantially the optimal size for scrubbing the optically active particles as they pass through the venturi scrubber are also quite effective for saturating the gas flow before it enters the venturi. While it is known in the prior art to introduce a spray of droplets upstream of a venturi to cool and saturate the gas flow, heretofore the cooling spray has not been used as the venturi spray, and has not been optimized either for collection of optically active particles in the effluent flow or for cooling. Thus, known prior art cooling sprays that were introduced upstream of a venturi have had relatively coarse droplets, i.e., droplets having a diameter much larger than the droplets of the present invention. The relatively small droplets of the present invention provide a large surface area which, for a given volume of water introduced into the system, provides a large surface area for convective heat exchange. In addition, the large surface area increases the rate of evaporation and, therefore, both the rate of evaporative cooling of the gas flow and the rate at which water vapor is added to the effluent stream.

It is not necessary, accordingly to the present invention, that the gas flow be fully saturated by the time the mixture of effluent gas and spray droplets reaches the entrance to the venturi throat. So long as the gas flow is close to the saturation point, the problem associated with evaporation of contaminated scrubbing droplets and the re-release of optically active contaminant particles into the gas flow will be effectively cured. As long as the gas flow is close to saturation, the rate of evaporation will be very low such that the scrubbing droplets can be collected before a problem arises.

For a given volume of liquid sprayed into the effluent flow by nozzles 35, bringing the gas flow to saturation using the relatively coarse sprays of the prior art would be much more difficult. FIG. 3A is a graph showing the cooling of a gas flow at an initial temperature of 302° F. for a volume of spray of one gallon per one thousand actual cubic feet of gas flow. The y-axis shows the temperature of the gas above its saturation temperature, and the x-axis shows the distance from introduction of the spray. The distance is based on a flow rate of 70 feet per second, which is a typical flow rate of systems using the present invention. Plots are shown for four different droplet diameters ranging from a low of 50 μm (within the range of the present invention) to a high of 500 μm, which is still smaller than what is typically used in the prior art. It will be noted that the droplets that are 50 μm will cool the gas flow to substantially saturation temperature less than ten feet downstream of the point of introduction, and that all of the curves for droplets 90 μm or less cool the flow to within about twenty-five degrees of the saturation temperature within about fifteen feet. In contrast, introducing the same volume of droplets with an MVD of 500 μm will only cool the gas flow to slightly under 150° F. above the saturation temperature at the distance of fifty feet from the nozzle.

FIG. 3B shows is a similar graph, however, the horizontal axis reflects the time, in seconds, from the point of spray introduction. It can be seen that for drops in the range of 50–100 μm, the gas flow is cooled to saturation in less than one second, while for drops that are 750 μm in diameter, the gas flow is still almost 100° F. above saturation temperature after five seconds.

Another way of viewing the advantage of using optimized droplets to cool the gas flow is demonstrated by FIGS. 4A and 4B. FIG. 4A is a graph showing the volume of cooling liquid needed to cool a gas flow at 302° F. to within one degree of its saturation temperature, with the x-axis representing the relative volume of liquid added to the gas flow and the y-axis showing the distance that the gas must travel before it reaches saturation. Again, the data assumes that gas flows through the system at a rate of 70 ft./sec. It will be noted that one gallon of 50 μm droplets per 1000 acf will cool the gas flow to near saturation within about 10 feet, whereas eight times the volume of liquid introduced as 750 μm droplets requires one hundred feet before it will cause the gas flow to become saturated.

Thus, injection of coarsely atomized scrubbing liquid would require an impractically long distance at normal duct velocities, i.e., they require an acceptably long residence time, to saturate the gases, and most of the droplets would fall out of suspension or agglomerate (i.e., deatomize) before reaching the venturi. In addition, a prohibitive quantity of coarsely atomized water would be required to produce the effect which is obtained when using the optimized droplets of the present invention. Accordingly, to the extent that the prior art has taught effective cooling of the gas flow prior to a venturi, it has taught the use of a two-stage process wherein a first, high-volume cooling spray is introduced in an upstream cooling chamber and a second source of scrubbing liquid is introduced at the venturi.

FIG. 4B is similar to FIG. 4A, however, the vertical axis represents the time it takes the gas flow to reach within one degree of saturation temperature. Thus, only one gallon droplets in the range of 50–100 μm per acf of saturated gas flow will cool the flow to saturation temperature in about 0.4–1.0 seconds, while eight times the flow of 750 μm droplets takes around eight seconds.

According to the present invention, only a small portion of the optimized spray droplets from nozzle 35 evaporate prior to reaching the venturi throat. Thus, the diameter of the droplets decreases only slightly by the time they reach the throat of the venturi, such that the droplets are still in the optimal range for scrubbing the effluent gas flow. If desired, evaporation of the spray droplets can be compensated for by adjusting the nozzle to introduce slightly larger droplets. The volume of water sprayed into the system should be sufficient such that both the number and size of droplets remaining in the gas flow as it passes through the venturi is optimized for the capture of optically active particles.

Cooling the effluent gas flow to approximately the saturation temperature before it passes through the venturi has a number of beneficial effects which improve the performance of the air pollution system. These include the elimination of evaporative transport by eliminating the migration of fine particles away from the surface of the venturi scrubbing droplets during evaporation and increasing the size of fine particles (via adsorption). By cooling the gas flow many of the condensible compounds in the gas flow, such as high molecular weight organic and toxic metals, are precipitated for capture by the venturi scrubber. In addition, the fine spray wets the larger particles in the effluent gas flow such that these large particles help remove the smaller, optically active particles from the gas flow. As depicted in FIG. 1, unlike many venturi scrubbing systems, the large particles are not collected prior to venturi stage.

Preferably, the scrubbing liquid used in the spray from nozzles 35 is at a relatively low temperature to facilitate cooling of the effluent flow by convective heat transfer. Where the ambient temperature is not low, as may be the case in a warm climate or in summer months, the scrubbing liquid may be actively chilled. Chilling of the scrubbing liquid may be accomplished by any of a number of known techniques such as evaporative cooling or refrigeration. Use of chilled liquid ensures adequate cooling of the effluent gas flow and increases the solubility of pollutant gases. Certain vapors, such as mercury, appear to be much more readily captured by chilled scrubbing liquid. Likewise, condensible hydrocarbons are also more readily captured with chilled scrubbing liquid.

The venturi design of FIG. 1, is particularly well suited to retrofit existing pollution control equipment to improve scrubbing efficiency and lower operating costs. A typical existing system will include a venturi stage immediately after an incinerator, boiler or other process which generates a flow of hot effluent gases. This venturi stage feeds a second scrubber stage such as an impingement scrubber or cyclonic separator. An existing venturi may be replaced by a straight duct section, which serves as the precooling chamber, placed ahead of the venturi scrubber of the present invention. The induced draft fan is replaced or slowed to produce the desired pressure drop across the venturi of the present invention while saving substantial energy.

As noted above, in many applications, the properties of the flow of contaminated gas to a scrubbing system vary over time. For example, the volume of contaminated gas through the system and/or the particulate loading of the effluent gas flow may be variable. In such circumstances, while the scrubbing system must be capable of handling the worst case conditions (e.g., maximum particulate loading) it is not necessary to provide the same degree or type of treatment under all conditions. When conditions change there is an opportunity to save operating expenses by adjusting the air pollution control system to meet reduced requirements.

In one embodiment of the present invention, a particle monitor 180 is positioned within stack 150. Particle monitor 180 and its associated electronic circuitry in control module (not shown) keep track of the concentration of particles which are present in the flow of effluent gases through the stack. The particle monitor control module communicates with nozzle controller 90 to automatically adjust the valves which control the gas and liquid flow to two-fluid nozzles 35. In accordance with one embodiment of the present invention, when the particle concentration in the effluent stream changes from a desired level, the particle monitor control module alerts the nozzle controller to vary the spray into the venturi to effect a commensurate change in the particulate collection efficiency. The spray may be varied by either changing the volume of liquid that is sprayed or by changing the droplet size within the spray from nozzles 35. As noted above, two-fluid nozzles have the capability of independent control over droplet size and spray volume. Generally, the volume of liquid sprayed is determined by the liquid pressure or flow to the nozzle such that the liquid flow may be increased in response to a higher particle concentration reading. On the other hand, droplet size is determined by the gas pressure applied to or gas flow to the nozzle, such that an increased particle concentration may be used, in accordance with the present invention, to increase the gas pressure or gas flow to the nozzle, while leaving the liquid flow generally unaffected. Both the volume of spray and the droplet size may be simultaneously adjusted or they may be sequentially adjusted. For example, the control system may first increase the volume of spray to a target level and if the particle concentration has not been adequately reduced it may then decrease the droplet size.

A particle monitoring subsystem, of the type which is useful in connection with the present invention may be obtained from the BHA Group, Inc., Kansas City, Mo. under the model designation CPM 1000™. This subsystem, which is based on LED technology and has an on-board microprocessor, provides a variable output voltage which may be used to control one or more valves. Changes in particle concentration may be averaged over user-determined periods of time to smooth out instantaneous variations in the measured particle concentration. In particular, the response time of the unit can be set anywhere between 0.1 to 999 seconds. Those skilled in the art will appreciate that other particle monitoring and control systems are equivalent and may also be used.

As shown in FIG. 1, it is preferred that particle monitor 180 be positioned downstream of fan 150 so that the gas has flowed through the fan before reaching the monitor. The energy of fan 150 slightly reheats the gas flow evaporating some of the extremely fine droplets that may have passed through the mist eliminator. This avoids including these droplets in the measurement of particle concentration.

Another control system according to the present invention may be used to monitor the volume of the gaseous effluent flow since, in many applications, the volume of effluent produced may vary over time. In one embodiment of the present invention the venturi acts as part of a flowmeter for this purpose. Differential pressure is used to calculate the gas flow. A pressure tap is positioned within the inlet throat portion of the venturi to measure the pressure within the venturi throat and another pressure tap is positioned within the venturi chamber upstream of the venturi throat. As is known in the art, the differential pressure is determined by subtracting the pressures measured at the two pressure taps. The output of the differential pressure gauge is used by the system to automatically adjusts the spray introduced by nozzles 35 in response to changes in the flow volume. A suitable differential pressure gauge for this purpose may be obtained from Dwyer Instruments, Inc., Michigan City, Ind., sold under the series designation "605." Those skilled in the art will appreciate that other differential pressure gauges may be used within one of the venturis or that equivalent approaches may be used to monitor the flow through the system.

When the flow through the venturi decreases, the acceleration of gases passing through the venturi likewise decreases. This adversely affects scrubbing efficiency which is related to the differential acceleration of the gases and the liquid droplets as they pass through the venturi. Thus, in accordance with a preferred embodiment of the present invention, when the system detects a reduced effluent gas flow, nozzle controller responds by increasing the volume of liquid which is sprayed into the venturi.

In a further aspect of the present invention, the temperature of the effluent flow in the system is monitored by temperature monitor 190 positioned before the entrance to the venturi. If the temperature of the gas flow rises, the volume of liquid introduced by nozzles 35 is increased to effect greater cooling. Although more complex, those skilled in the art will appreciate that the temperature of the water spray introduced may also be adjusted.

While the present invention has been described in conjunction with preferred embodiments thereof, it will be apparent to those skilled in the art that there are many variations and equivalents of that which has been described. For example, while the present invention has been described so as to optimize the collection of optically active particles, in certain applications it may be desired to increase the collection efficiency of particles within a different size range. Accordingly, it is intended that the invention should be limited only by the following claims.

What is claimed is:

1. A method of cleansing a flow of contaminated gas using a venturi scrubber, said gas being at an initial temperature which is substantially greater than the moisture saturation temperature of said gas, comprising the steps of:

introducing a spray of water droplets having a predetermined diameter into the gas flow a predetermined distance upstream of the throat of said venturi scrubber such that said gas flow becomes substantially saturated by the time said gas flow reaches the throat of said venturi and such that a substantial number of water droplets remain within the gas flow, the remaining droplets entering the throat of said venturi having a diameter which is in the range of between about 10 to 200 microns, and causing the mixture of the gas flow and the remaining water droplets to pass through the throat of said venturi scrubber, such that the gas flow is scrubbed by said droplets.

2. The method of claim 1 wherein said water is actively cooled.

3. The method of claim 1 wherein the volume of water introduced by said spray into the gas flow is between 1–10 gallons per 1000 acf (saturated).

4. The method of claim 1 further comprising monitoring a characteristic of the gas flow and adjusting the spray introduced into the gas flow in response to changes in the characteristic of the gas flow.

5. The method of claim 1 wherein said spray is introduced upstream of the entrance cone of said venturi scrubber such that the residence time of the droplets in the gas flow is between 0.05 and 2.0 seconds before the droplets reach the venturi throat.

6. The method of claim 5 wherein said spray is introduced a distance from the throat of the venturi such that the residence time is between 0.1 and 1.0 seconds.

7. An air pollution control system for cleansing a flow of high-temperature gas, said gas being above its water vapor saturation temperature comprising:

a venturi scrubber having an entrance cone, a throat and an exit cone, nozzle means positioned substantially upstream from the throat of said venturi scrubber for introducing a spray of water droplets into the gas flow, and for substantially saturating the gas flow, the diameter of the water droplets in said spray being predetermined such that when said droplets reach the throat of the venturi they have a diameter which is between 10 to 200 microns.

8. The air pollution control system of claim 7 wherein the volume of water introduced into the gas flow by said spray is between 1 and 10 gallons per 1,000 acf (saturated).

9. The air pollution control system of claim 7 wherein the range of gas flow rates through the system is known and the nozzle means is positioned a distance from the venturi throat such that the residence time of the droplets in the gas flow is between 0.05 and 2.0 seconds before the droplets reach the throat for gas flows rates within said known range.

10. The air pollution control system of claim 7 further comprising means for actively cooling the water sprayed into the gas flow.

11. The air pollution control system of claim 7 wherein said nozzle means is positioned upstream of the entrance cone of said venturi.

12. The air pollution control system of claim 7 wherein said nozzle means comprises a two-fluid nozzle.

13. The air pollution control system of claim 7 further comprising monitoring means for monitoring a characteristic of the gas flow and control means for adjusting the characteristics of the spray introduced into the gas flow in response to changes in said characteristic.

14. The air pollution control system of claim 13 wherein said monitoring means measures the number of particles in the gas flow downstream of said venturi throat.

15. The air pollution control system of claim 13 wherein said monitoring means measures the temperature of the gas flow.

16. The air pollution control system of claim 13 wherein said monitoring means measures the volume of gas flow per unit time.

* * * * *

UNITED STATES PATENT AND TRADEMARK OFFICE
CERTIFICATE OF CORRECTION

PATENT NO. : 5,512,085  Page 1 of 1
DATED : April 30, 1996
INVENTOR(S) : Schwab, James J.

It is certified that error appears in the above-identified patent and that said Letters Patent is hereby corrected as shown below:

Column 9,
Line 55, delete "hp/acfm" and substitute therefor -- horsepower per 1000 acfm --.

Signed and Sealed this

Eleventh Day of June, 2002

Attest:

Attesting Officer

JAMES E. ROGAN
Director of the United States Patent and Trademark Office